United States Patent [19]
Holzrichter

[11] 4,088,619
[45] May 9, 1978

[54] WATER-DISPERSIBLE, POLYESTER-BASED COATINGS FORMULATIONS AND METHOD OF MAKING SAME

[75] Inventor: Edward Julius Holzrichter, Riverside, Calif.

[73] Assignee: Whittaker Corporation, Los Angeles, Calif.

[21] Appl. No.: 764,115

[22] Filed: Jan. 31, 1977

[51] Int. Cl.² .............................................. C08L 61/20
[52] U.S. Cl. .......................... 260/29.4 R; 260/33.4 R; 260/75 T; 260/850
[58] Field of Search ............ 260/850, 29.4 R, 29.2 E, 260/75 T, 475 P, 33.4 R

[56] References Cited
U.S. PATENT DOCUMENTS

| | | | |
|---|---|---|---|
| 3,102,868 | 9/1963 | Bolton et al. | 260/850 |
| 3,310,512 | 3/1967 | Curtice | 260/850 X |
| 3,549,577 | 12/1970 | Stromberg | 260/29.4 R |
| 3,862,072 | 1/1975 | Sekmakas | 260/29.4 R |
| 3,908,050 | 9/1975 | Gor | 260/850 X |
| 3,992,346 | 11/1976 | Hartmann et al. | 260/850 X |

Primary Examiner—Lucille M. Phynes
Attorney, Agent, or Firm—Donald E. Nist

[57] ABSTRACT

Essentially linear polyester resins are made with a limited number of reactive hydroxyl and carboxyl groups pendant thereto. Such polyester resins are made water-dispersible by admixing therewith selected coupling solvents and amine compounds. Heat-curable coatings formulations are made therefrom by combining the water-dispersible polyester resins with water-soluble aminoplast resins and water.

13 Claims, No Drawings

WATER-DISPERSIBLE, POLYESTER-BASED COATINGS FORMULATIONS AND METHOD OF MAKING SAME

Background Of The Invention

1. Field of the Invention

This invention generally relates to compositions and more particularly to improved heat-curable resin coatings which can employ aqueous media.

2. Prior Art

Rather than individually coating countless pieces of metal after they have been cut and formed to prescribed dimensions and shapes, coaters can effect substantial cost savings by passing continuous sheets of metal at high speed (on the order of 4 ft./sec.) through a coating line, coating the metal, coiling the coated metal, and thereafter cutting and forming the coated metal to desired sizes and shapes. However, a number of problems have arisen for coil coating manufacturers utilizing such techniques. In addition to having to provide liquid coatings which will result in dried coatings having the requisite flexibility (for forming) and hardness (for wear), the coil coatings manufacturer must also assure that the liquid coatings can be applied smoothly at high speeds, can be cured in a short time without surface defects, can be applied as relatively thick (dry) films of the order of 0.5-1.5 mils, and can resist water and organic solvents encountered in the coating operation and during the lives of articles made from the coated metal. Additionally, because of the threat to the environment caused by organic solvents, the aforementioned coatings properties should be realized from water-dispersible coatings so that water can be utilized for a substantial percentage of the total coatings solvent.

Although water-borne coil coatings compositions are presently available, they exhibit one or more of the following disadvantages. They cannot be applied in sufficiently thick films without producing significant surface defects. They often achieve the desired hardness only at the expense of reduced flexibility. They cannot be cured in a relatively short time without significant surface defects. Such defects may be in the form of blisters caused by water boiling out of the curing film. The cured films are highly resistant to water.

SUMMARY OF THE INVENTION

The improved coating compositions of the present invention have none of the disadvantages described above for conventional water-dispersible coating compositions. This invention is substantially as set forth in the Abstract above. Thus, the improved coating compositions each comprise a water-dispersible polyester-/aminoplast coatings admixture which can be applied to selected substrates from aqueous media by high speed coil coating apparatus at relatively high film weights and which can be cured in a short time (usually less than one minute) without blistering.

More specifically, in the preferred method of making the aforementioned coatings admixture, a two-stage procedure is followed to make the polyester component. In the first stage, diol (and, if desired, small amounts of triol) and dicarboxylic acid (or dicarboxylic acid anhydride in a molar ratio which provides an excess of hydroxyl groups to carboxyl groups are esterified at elevated temperature to form a low molecular weight polyester intermediate. The polyester intermediate is then esterified at reduced temperature with a dicarboxylic acid anhydride to produce the desired polyester having a substantial number of reactive pendant carboxyl and hydroxyl groups. The polyester resin is made water-dispersible by reaction with a fugitive amine to produce an amino salt and by organic coupling solvent included in the coating formulation. A water-dispersible aminoplast resin is admixed with the resulting modified polyester resin to provide the desired polyester/aminoplast admixture to which water is added to produce a heat-curable coatings formulation of improved properties.

Use of the described coatings formulation provides several advantages. One advantage results from the use of water as the principal solvent, thereby reducing the pollution otherwise caused by organic solvents. Another advantage derives from the ability of the described formulation to be coated at high speeds and at relatively high non-volatile material (NVM) content without coating surface defects, in contrast to other water-borne coatings. Still another advantage over such conventional coatings is obtained from the ability of the described coatings formulation to be cured in a relatively short time without surface disturbances (such as bubbling) even at high film weights (high NVM). A further advantage is that relatively thick films can be smoothly applied to substrate surfaces. Additionally, because the hydroxyl content of the polyester constituent is maintained at a minimum level, the resulting coatings are more flexible, and deformed areas (e.g., areas including a bend) remain stable and continuous even after aging.

Coatings produced from the described polyesters exhibit high hardness with good flexibility even though relatively very high amounts of aromatic material (of the order of up to about 60–65% by wt. of the weight of polyester resin) are present in the polyester resin. In the past, it has been customary to regard the types of polyester constituents, i.e., aromatic or aliphatic, as being the essential factor governing the flexibility/hardness balance. As a result, the amount of aromatic constituent has generally been limited to about 35 to 45% or less in order to retain flexibilities on the order of 2%. However, improved hardness/flexibility balance is obtained with the herein-described polyesters at substantially higher levels of aromatic constituent because polyester physical structure has now been recognized as also being a major factor, along with polyester constituents, in producing the aforementioned property balance at high aromatic levels.

DESCRIPTION OF THE PREFERRED EMBODIMENT

The coil coatings formulation of the present invention comprises a polyester resin having reactive pendant hydroxyl and carboxyl groups, a water-soluble aminoplast resin, an amine, a coupling solvent for solubilizing the polyester resin, and water. The polyester resin is made by the esterification at elevated temperatures of an anhydride with a polyester intermediate which, in turn, is produced by esterification at elevated temperatures of a diol (and small amounts of triol, if desired) with a dicarboxylic acid (and/or its anhydride).

Although the polyester resin could theoretically be made in a single batch operation, control of the reaction to produce the desired end product efficiently is sufficiently difficult to make it preferable to produce the polyester resin in a two-stage procedure which will now be described, together with the components and component ratios.

The diols used herein are saturated aliphatic diols, preferably those selected from the group consisting of neopentyl glycol, 1,6-hexanediol and cyclohexane dimethanol.

As previously noted, some triol may be used in combination with the diols. However, since an object of this invention is to produce an essentially linear polyester resin with substantial spacing between reactive groups in order to aid in obtaining the desired combination of flexibility and hardness for coil coatings, the amount of triol is limited to less than about 10 mole precent of the total moles of diol and triol (polyol). Preferably, any triol used is present in an amount less than about 5 mole percent of the total number of moles of polyol. Preferred triols are trimethylol ethane and trimethylol propane.

The dicarboxylic acids (and their correspeonding anhydrides) are aromatic and are preferably those selected from the group consisting of phthalic acid, isophthalic acid, terephthalic acid, and mixtures thereof. Even though these aromatic acids and anhydrides would normally be expected to produce hard, but brittle coatings, particularly at the levels at which they can be used herein, the finished coatings remain flexible because of the particular structure of the described polyester resins. Although increased flexibility could be obtained utilizing aliphatic dicarboxylic acids, the latter are not used, primarily because polyesters made therefrom are not sufficiently stable in aqueous solution or in the presence of water to serve as coil coating constituents. That is, their greater susceptibility to hydrolysis can adversely affect coatings made therefrom. Not only is this of importance when the resin is coated from an aqueous medium, as here, but this is of particular importance in coil coating technology, in general, since many coil coaters use water in a quenching step, after the coatings have been cured at elevated temperatures, to cool the coatings and underlying substrates. After quenching, the quench water is removed. However, water removal may not be totally complete and, if not, water becomes entrapped between coils of coiled coated metal. That water will, of course, tend to hydrolyze the cured coating, particularly if the coiled material is stored for a long time and most particularly if, after quenching, the coiled material still retains some heat.

As noted hereinbefore, the diol constituent is esterified with the dicarboxylic acid constituent to produce a polyester intermediate. The latter is then esterified with an aromatic anhydride, preferably selected from the group consisting of phthalic anhydride, trimellitic anhydride and mixtures thereof. The corresponding acids are not used for this step because the reactivity of each of the carboxyl groups of such acids is essentially the same so that it is very difficult from a commercial production standpoint to selectively react only one member of each carboxyl group pair. On the other hand, anhydride reaction is faster than the equivalent acid rate of reaction. There is therefore a marked difference in the rates of reaction of the anhydride carboxyl groups — a fact which is taken advantage of herein, as more particularly described hereinafter.

For the purpose of making the polyester resin water-soluble or water-dispersible, both fugitive amines and coupling solvents are utilized. The preferred amines are those which are generally referred to as "slow" amines because they have relatively high boiling points, e.g., on the order of 130° to 180° C, which means that such amines are driven off from the curing coatings at a relatively slow rate. Fast amines (with low boiling points on the order of 80° to 100° C) can induce wrinkling of the coating surface because of their rapid rate of removal from the curing coating. Although "slow" and "fast" amines have been defined, there cannot be a precise definition which avoids overlapping of the defined terms because, to some extent, those definitions depend upon the characteristics of the other components in the coating formulation and upon coating application parameters. Amines are used to form a salt with the carboxyl groups of the polyester because they do not leave undesirable residues (such as water-sensitive sodium ions if sodium hydroxide is used) when driven off. Additionally, the useful amines are capable of being substantially completely removed from the coating composition.

Although ammonia can be used as the water-solubilizing amine, the most useful amines are tertiary amines as exemplified by dimethyl ethanolamine, diethyl ethanolamine and 2-aminomethyl propanol.

The coupling solvents are water-miscible, organic solvents capable of coupling the polyester resin to water in the coating formulation. Useful coupling solvents have a sufficiently high boiling point so that they remain in the film until the water is essentially completely removed therefrom, whereupon the solvents themselves evaporate in the final stages of cure. They may be used in any suitable concentration in the present composition.

Coupling solvents which are preferred are selected from the group consisting of 2-butoxyethanol, diacetone alcohol, 2-butoxydiethylene glycol and mixtures thereof. Each of these coupling solvents has a boiling point well below the usual coil coating cure temperature but sufficiently high so that the solvents are retained in the film until at least most of the water has been evaporated.

The aminoplast resins (most commonly the condensation products of an aldehyde, e.g., formaldehyde, with melamine, urea or benzoguanamine) are selected to provide a relatively high reactivity level consistent with the functional group spacing in the polyester resin. Useful aminoplast resins are those which are water-soluble and which are compatible with the herein-described polyester resins. By compatibility is meant, inter alia, a propensity for the aminoplasts to react with the polyester resin rather than with themselves. Preferred aminoplasts are the alkylated (etherified) and alkylolated melamines exhibiting the foregoing characteristics and particularly those having a plurality of alkyl and/or alkylol groups having 1-4 carbons. The useful melamines may be monomeric or polymeric and include hexamethoxymethyl melamine, and melamines having various combinations of both pendant methoxy and methylol groups. In order to take advantage of the low cost and availability of the urea-based aminoplasts, mixtures of melamines and ureas (both alkylated and alkylolated) may be satisfactorily used. Where ureas are used, they must also be water-soluble and compatible with the polyester resin.

It is to be understood that members of the various components may be used individually or as mixtures with other members of such component(s), e.g., neopentyl glycol and 1,6-hexane diol could be used together as the diol constituent.

In the preparation of the polyester resin, a polyester intermediate is first made by esterifying the diol with the dicarboxylic acid in a molar ratio of diol to dicarboxylic acid between about 1.25:1 and about 1.5:1. Above the latter ratio, the reactivity is too great, thereby producing excessive cross-linking of the polyester resin which, in turn, leads to coatings which are too hard and which are characterized by poor formability. Below the ratio of 1.25:1, there is a significant and adverse increase in molecular weight with a corresponding decrease in solids (NVM) at acceptable viscosities. This means that more wet film has to be applied in order to obtain a desired dry film thickness. Application of thicker films causes film cure problems such as blistering.

The diol and dicarboxylic acid are placed in a suitable reactor vessel from which the oxygen is substantially purged, either by drawing a vacuum on the vessel or by displacing the air with a gas inert to the reactants. The reactor is then heated to a temperature at which esterification of the reactants takes place within an acceptable time. Temperatures on the order of 200° to 240° C may be used to complete the first stage reaction in about 3 to 8 hours. Reaction time may be accelerated using a catalyst such as dibutyl tin oxide as is well known.

The first stage reaction is continued until an acid number below about 10 (mg. of KOH) is obtained on the nonvolatile materials (solids) in the reactor. For control purposes, the viscosity of the reaction mixture is monitored at 60% (by wt.) NVM in xylene. When the first stage reaction is "complete," as indicated by the aforementioned parameters, the reaction temperature is reduced to a temperature at which the anhydride ring opens readily for esterification of a first carboxyl group, but at which esterification of the second carboxyl group will not take place readily. By regulating the temperature in this manner, a low molecular weight polyester resin molecule is assured. Typically, the temperature during the second-stage reaction is about 140° to about 165° C.

The amount of anhydride utilized is preferably the minimum required to obtain the desired water solubility (in conjunction with the amine and coupling solvent). Such amount is indicated by the acid number of the polyester resin which should be between about 35 and about 75, preferably between about 45 and about 60, and most preferably about 50. Below an acid number of about 35, the polyester resin has poor water solubility because not enough amine can be used (since there are too few carboxyl groups to react with). Additionally, an amount of coupling solvent sufficient to compensate for the insufficient amount of amine cannot be used because such amount of coupling solvent would violate the pollution standards of the EPA. Above an acid number of about 75, problems are encountered with the larger amounts of amine necessarily utilized. Such problems include odor, expense, and retarding of coating cure because there is an increased amount of amine which must be removed before cure can be accomplished, and a chance that under the particular coating and drying conditions, all such amine might not be removed.

The polyester resin produced at the end of the second stage is generally characterized by a low molecular weight on the order of 700-2000 (preferably 900-1200 and most preferably about 1000), an hydroxyl number of about 40-60, and the described acid number. For good water solubility, the polyester resin preferably has about one carboxyl group per 1000 molecular weight. It will thus be understood that the polyester resin has both reactive pendant carboxyl groups and reactive pendant hydroxyl groups (an average of 2 or less hydroxyls per molecule and preferably about 1 to 1.5). These characteristics of the polyester resin ensure that the advantages hereinbefore-described will be obtained.

After the second-stage esterification has been "completed," as indicated by the NVM acid number as described, the coupling solvent and amine are added (usually after cooling of the reactor vessel). Water, preferably in the form of distilled or deionized water, is added at this time although, in some cases, it may be preferable to allow the coil coater to add some of the water to save the expense of shipping water in the coating formulation. The amount of water ultimately used is sufficient to provide the desired solids content, typically 35 to 40% NVM, and together with other solvents used, to provide the desired viscosity, typically less then Z (Gardner-Holt) viscosity.

The amount of coupling solvent and amine added is that which is required to water-solubilize the polyester resin, but which will not violate EPA rules. Typically, the amount of amine used will be between about 4 and about 6% by wt. of the total solvent. Generally, an amount of amine is used which is sufficient to provide a solution pH of at least 7 and preferably about 7.5–8.5, although the pH of a given solution will depend to some extent on the percent solids (NMV) of that solution. Water constitutes a major portion of the total solvent and typically comprises about 80 to 90% by wt. of the total weight of solvent or solubilizing agent (amine, coupling solvent, water and any other solvent which may be present).

The aminoplast is added to the described admixture in an amount sufficient to react with the reactive pendant hydroxyl and carboxyl groups of the polyester resin. Some excess of aminoplast may be used. Typically, the amount of aminoplast will vary between about 5 and about 30% by weight of the total weight of aminoplast and polyester resin.

The resulting coating formulation is coated on a selected surface and cured (cross-linked) at elevated temperatures (typically 260° to 427° C) for a time sufficient to remove substantially all of the solvent (typically 20 sec. to 90 sec.) at the aforementioned temperatures on a coil coating line. Due to the described characteristics of the coating formulation, cure is sufficiently retarded or slowed to allow substantially all of the solvent to escape while the film is still "wet" so that the dry film surface is smooth. Typically, the dry film is 0.0125 to 0.025 mm thick.

This invention will be further described by the following Examples.

EXAMPLE 1

To a reactor vessel which was fitted with stirrer and gas connections and which had been purged with carbon dioxide, the following charge was added: 18.2 lb. of 1,6-hexanediol; 27.7 lb. of neopentyl glycol; 25.8 lb. of isophthalic acid (85% by weight); 23 lb. of phthalic anhydride; 2.06 lb. of trimethylol ethane; and, 0.11 lb. of dibutyl tin oxide (Thermolite T-15).

With the inert gas continuously being flowed into the reactor vessel, the foregoing charge was first heated to approximately 121° C (250° F) to melt it. After the charge was melted, the temperature was slowly raised to 238° C (460° F). The latter temperature was held until an acid number of less than 10 was obtained and the viscosity was D-F at 60% NVM in xylene. After the aforementioned specifications were obtained, the resin solids were cooled to 163° C (325° F). When this temperature was reached, 11.5 lb. of phthalic anhydride were added and heating at 163° C was continued for about 1⅞ hour. At the end of that time, the acid number was between 50 and 60. Thereafter, 17.6 lb. of diethylene glycol monobutyl ether were added to the reactor and its contents were cooled to about 105° C (220° F).

A mixture of 7.44 lb. of dimethylethanolamine (DMEA) and 160.6 lb. of distilled water was added to a clean thin tank. The contents of the reactor vessel were then transferred to the clean tank, after which the latter was cooled to about 49° C (120° F).

The contents of the thin tank were characterized as follows: viscosity-W-Y, NVM 34-36%, pH 7.0-7.8; density 8.7-8.8 lb. per gallon; and color-1 max.

A paint was made from the foregoing formulation as follows.

To a sand mill there were added the following constituents: 15.34 parts of a 35% by weight solids in xylene solution of the foregoing polyester resin (designated as "resin A"); 0.26 parts of a commercial defoamer (Nalco 42J19); 0.04 parts of DMEA; 2.87 parts of deionized water; 0.3 parts of ethylene glycol monobutyl ether; and 14.85 parts of titanium dioxide. That admixture was milled to a particle size of 7.5—8NS (National Standard — Hegmen Gauge). After being milled to the aforementioned size, the resulting admixture was combined with the following constituents: 54.08 parts of resin A (35% solids); 2.66 parts of a melamineformaldehyde resin; 1.9 parts of a 10% by weight solution of GE silicone fluid 1141 (in ethylene glycol monobutyl ether); 6.47 parts of deionized water; 0.82 parts of ethylene glycol monobutyl ether; 0.22 parts of DMEA; and 0.19 parts of a 20% solution of para-toluene sulfonic acid.

The foregoing aqueous formulation was coated on 0.022 inch thick Bonderite 901 pretreated cold rolled steel and cured at 343° C for 35 seconds (corresponding to a peak metal temperature of 250° C). The cured film which had a (dry) film thickness of about 0.0175 mm exhibited the following characteristics: pencil hardness — F; gloss — 98; flexibility — no cracking or tape-off when subjected to a 2T bend, but some cracking and tape-off when subjected to a 0T bend; hardness — no tape-off when subjected to a 20 ft/lb. reverse impact; and flow-good. It should be noted that the diol and triol to acid and anhydride ratio used in making the ester intermediate was about 1.5:1. The molecular weight of the finished polyester resin was about 1,000. No blistering of the coating occurred using this resin in the indicated paint.

EXAMPLE II

The procedure of Example I was followed utilizing the formulation set forth in Table I below:

Table I

| Part I | | |
|---|---|---|
| 1. Trimethylol Ethane | 3.48 lb. | |
| 2. Neopentyl Glycol | 18.10 lb. | |
| 3. 1,6 Hexanediol | 20.17 lb. | |
| 4. Orthophthalic Anhydride | 25.76 lb. | |
| 5. Isophthalic Acid 85% | 28.87 lb. | |
| 6. Dibutyl tin Oxide | 0.12 lb. | |
| Part II | | |
| 7. Orthophthalic Anhydride | 12.88 lb. | |
| Part III | | |
| 8. Butyl Carbitol | 26.93 lb. | |
| 9. Dimethylethanolamine | 12.24 lb. | |
| 10. Distilled Water | 205.66 lb. | |
| | 109.38 lb. | NVM Charge |
| | 9.38 lb. | Theoretical Distillate |
| | 100.00 lb. | NVM Yield |
| | 344.83 lb. | Solution Yield |

Thus, the components identified as Part I were heated together to form a melt and then brought to process temperature of 460° F. That temperature was maintained until an acid number of less than 10 was obtained and a viscosity of Q-R at 60% NVM xylene. The mix was then cooled to 325° F, after which the component of Part II was added and the resultant mixture was held at 300° F for ½ hour. At the end of that time the acid number was about 50-60, whereupon the butyl carbitol of Part III was added and the mix was cooled to 120° F, the remaining components of Part III then being added. Final specifications for this resin were as follows:

| Viscosity: | $Z_5+$ | |
|---|---|---|
| NVM: | 29.0% | |
| pH: | 7.8 | |
| Solvents: | Distilled Water | 84.0% |
| | Butyl Carbitol | 11.0% |
| | Dimethylethanolamine | 5.0% |
| Color: | | 1 - 2 |
| Wt./Gal.: | | 8.81# |
| Appearance: | | Slight haze |

It was determined that the polyester resin had a molecular weight in excess of about 3,000 and that the intermediate resin had a mole ratio of diol and triol to acid and anhydride of about 1:1. The resin could not be successfully formulated into a paint usable as a protective film for coil coating or the like without blistering.

EXAMPLE III

The exact procedure of Example II was followed in preparing a resin for incorporation into a coil coating paint, except that the formulation utilized was that set forth in Table II below:

Table II

| Part I | | |
|---|---|---|
| 1. 1–4 Cyclohexanedimethanol | 21.40 lb. | |
| 2. Neopentyl Glycol | 26.64 lb. | |
| 3. Orthophthalic Anhydride | 22.09 lb. | |
| 4. Isophthalic Acid 85% | 24.80 lb. | |
| 5. Trimethanol Ethane | 1.98 lb. | |
| 6. Dibutyl tin Oxide | 0.10 lb. | |
| Part II | | |
| 7. Orthophthalic Anhydride | 11.05 lb. | |
| Part III | | |
| 8. Butyl Carbitol | 17.64 lb. | |
| 9. Dimethylethanolamine | 7.43 lb. | |
| 10. Distilled Water | 160.64 lb. | |
| | 108.06 lb. | NVM Charge |
| | 8.06 lb. | Theoretical Distillate |
| | 100.00 lb. | NVM Yield |
| | 285.71 lb. | Solution Yield |

Thus Part I of the formulation was heated to a melt and then slowly to process temperature of 460° F and held for a viscosity of G-H at 60% NVM in xylene and an acid value of less than 10. The intermediate resin so formed had a mole ratio of diol and triol to acid and anhydride of about 1.45:1. The solids were then cooled to about 325° F and Part II of the formulation was added, whereupon the mix was held at 325° F for ½ hour to obtain an acid value of about 50-60. The butyl carbitol of Part III was then added and the mixture was then cooled to 120° F, whereupon the remainder of Part III was added to the formulation. The resulting resin had a molecular weight of about 1,000 and the following other characteristics:

| Viscosity: | Z₇+ | |
|---|---|---|
| NVM: | 35% | |
| pH: | 8.3 | |
| Solvents: | Distilled Water | 86.5% |
| | Butyl Carbitol | 9.5% |
| | Dimethylethanolamine | 4.0% |
| Color: | 1 | |
| Wt./Gal.: | 8.86 # | |
| Appearance: | Clear & Stable | |

A paint was made from the foregoing formulation as follows:

To a sand mill there were added the following constituents: 19.73 parts of 35% NVM in xylene of the polyester resin (designated as "resin B" obtained above; 0.39 parts of a commercial defoamer (Nalco 42J19); 0.04 parts of DMEA; 1.32 parts of deionized water; 0.44 parts of butyl cellosolve; and 21.92 parts of titanium dioxide. That admixture was milled to a particle size of 7.5—8NS (National Standard — Hegmen Gauge), and then was combined with the following constituents: 42.84 parts of resin B (35% solids); 5.40 parts of a melamine-formaldehyde resin; 1.61 parts of a 10% by weight solution of a silicone wetting agent (GE 1141) in butyl cellosolve; 0.60 parts of a 10% concentration of an acrylic wetting agent in butyl cellosolve (Reichold 13–420); 5.41 parts of deionized water; and 0.30 parts of a 16.6% solution of para-toluene sulfonic acid, blocked with DMEA.

The foregoing aqueous formulation was then coated and cured as specified in Example I and found to have the following characteristics: free of blistering; pencil hardness-H, sensitivity to 4-hour water soak at 120° F — highly resistant. Accordingly, the resin used in the paint exhibited improved properties.

EXAMPLE IV

The exact procedure of Example II was followed in preparing a resin for incorporation into a coil coating paint, except that the formulation utilized was that set forth in Table III below:

Table III

| Part I | | |
|---|---|---|
| 1. Neopentyl Glycol | 27.72 lb. | |
| 2. Orthophthalic Anhydride | 45.97 lb. | |
| 3. 1,6 Hexanediol | 18.25 lb. | |
| 4. Trimethanol Ethane | 2.06 lb. | |
| 5. Dibutyltin Oxide | .11 lb. | |
| Part II | | |
| 6. Orthophthalic Anhydride | 11.49 lb. | |
| Part III | | |
| 7. Butyl Carbitol | 17.64 lb. | |
| 8. Dimethylethanolamine | 7.43 lb. | |
| 9. Distilled Water | 160.64 lb. | |
| | 105.60 lb. | NVM Charge |
| | 5.60 lb. | Theoretical Distillate |
| | 100.00 lb. | NVM Yield |
| | 285.71 lb. | Solution Yield |

Thus Part I of the formulation was heated to a melt and then slowly to process temperature of 460° F and held for a viscosity of D-E at 60% NVM in xylene and an acid value of less than 10. The intermediate resin so formed had a mole ratio of diol and triol to acid and anhydride of about 1.45:1. The solids were then cooled to about 325° F and Part II of the formulation was added, whereupon the mix was held at 300° F for ½ hour to obtain an acid value of about 50–60. The butyl carbitol of Part III was then added and the mixture was then cooled to 120° F, whereupon the remainder of Part III was added to the formulation. The resulting resin had a molecular weight of about 1,000 and the following other characteristics:

| Viscosity: | X - 4 | |
|---|---|---|
| NVM: | 35% | |
| pH: | 7.5 | |
| Solvents: | Distilled Water | 86.5% |
| | Butyl Carbitol | 9.5% |
| | Dimethylethamolamine | 4.0% |
| Color: | 1.0 | |
| Wt./Gal.: | 8.86# | |
| Appearance: | Slight Haze | |

A paint was made from the foregoing formulation as follows:

To a sand mill there were added the following constituents: 19.12 parts of a 35% by weight NVM in xylene solution of the foregoing polyester resin (designated as "resin C"); 0.38 parts of a commercial defoamer (Nalco 43J19); 0.04 parts of DMEA; 1.28 parts of deionized water; 0.42 parts of butyl cellosolve; and 21.24 parts of titanium dioxide. That admixture was milled to a particle size of 7.5—8NS (National Standard — Hegmen Gauge). After being milled to the aforementioned size, the resulting admixture was combined with the following constituents: 45.09 parts of resin C (35% solids); 4.41 parts of a melamine-formaldehyde resin; 1.2 parts of a 10% by weight solution of GE silicone fluid 1141 wetting agent (in ethylene glycol monobutyl ether); 6.02 parts of deionized water; 0.60 parts of a 10% by weight acrylic acid concentration in ethylene glycol monobutyl ether as a wetting agent; and 0.20 parts of a 16.6% solution of para-toluene sulfonic acid, blocked with DMEA.

The foregoing aqueous formulation when coated on 0.022 inch thick Bonderite 901 pretreated cold rolled steel and cured at 343° C for 35 seconds (corresponding to a peak metal temperature of 250° C), had essentially the characteristics of the formulation of Example III, but slightly greater 25°–180° bend strength. The coil coating so formed was nonblistering and was smooth, as was that of Example III.

EXAMPLE V

The procedure of Example II was followed in preparing a resin for incorporation into a coil coating paint, except that the formulation utilized was that set forth in Table IV below:

Table IV

| Part I | | |
|---|---|---|
| 1. Neopentyl Glycol | 25.66 lb. | |
| 2. Orthophthalic Anhydride | 18.27 lb. | |
| 3. Isophthalic Acid | 20.46 lb. | |
| 4. 1,6 Hexanediol | 29.10 lb. | |
| 5. Dibutyl tin Oxide | .11 lb. | |
| Part II | | |
| 6. Orthophthalic Anhydride | 13.08 lb. | |
| Part III | | |
| 7. Butyl Carbitol | 31.20 lb. | |
| 8. Dimethylethanolamine | 15.45 lb. | |
| 9. Distilled Water | 103.35 lb. | |
| | 106.69 lb. | NVM Charge |
| | 6.69 lb. | Theoretical distillate |
| | 100.00 lb. | NVM Yield |
| | 250.00 lb. | Solution Yield |

Thus Part I of the formulation was heated to a melt and then slowly to process temperature of 460° F and held for a viscosity of D-E at 60% NVM in xylene and an acid value of less than 10. The intermediate resin so formed had a mole ratio of diol and triol to acid and anhydride of about 1.6:1. The solids were then cooled to about 325° F and Part II of the formulation was added, whereupon the mix was held at 300° F for ½ hour to obtain an acid value of about 50-60. The butyl carbitol of of Part III was then added and the mixture was then cooled to 120° F, whereupon the remainder of Part III was added to the formulation. The resulting resin had a molecular weight of about 500 and the following other characteristics:

| Viscosity: | G - H | |
|---|---|---|
| NVM: | 40% | |
| pH: | 8.2 | |
| Solvents: | Butyl Carbitol | 20.8% |
| | Dimethylethanolamine | 10.3% |
| | Distilled Water | 68.9% |
| Color: | 1 | |
| Wt./Gal.: | 8.83# | |
| Appearance: | Slight Haze | |

A paint was made form the foregoing formulation as follows:

To a sand mill there were added the following consituents: 22.58 parts of a 35% by weight solids in xylene solution of the foregoing polyester resin (designated as "resin D"); 0.44 parts of a commercial defoamer (Nalco 42J19); 0.05 parts of DMEA; and 25.10 parts of titanium dioxide. That admixture was milled to a particle size of 7.5—8NS (National Standard — Hegmen Gauge). After being milled to the aforementioned size, the resulting admixture was combined with the following constituents: 43.68 parts of resin D (35% solids); 5.67 parts of a melamine-formaldehyde resin; 1.53 parts of a 10% by weight solution of GE silicone fluid 1141 (in ethylene glycol monobutyl ether) as a wetting agent; 0.71 parts of a 10% by weight concentration of an acrylic in ethylene glycol monobutyl ether (Reichold 13-420) as a wetting agent; and 0.19 parts of a 16.6% solution of para-toluene sulfonic acid, blocked with DMEA.

The foregoing aqueous formulation was coated on 0.022 inch thick Bonderite 901 pretreated cold rolled steel and cured at 343° C for 35 seconds (corresponding to a peak metal temperature of 250° C). The cured film exhibited no blistering, but was bumpy and irregular, not smooth. The aqueous formulation when coated on the cold rolled steel could not be applied smoothly. Hence, the formulation was unsatisfactory.

What is claimed is:

1. The method of making an improved liquid coatings formulation, said method comprising the steps:
   (a) esterifying a mixture of saturated aliphatic diol and aromatic dicarboxylic acid and/or anhydride thereof, in a mole ratio of diol-to-acid and/or anhydride thereof of about 1.25-1.5:1 at a first elevated temperature until an acid number below about 10 (in mg. of KOH) is obtained on the non-volatile materials so as to form an intermediate reaction product;
   (b) reacting said intermediate reaction product with an amount of aromatic dicarboxylic acid anhydride sufficient to increase the acid number of the resulting reaction product to about 35-75, said reaction being effected at a second elevated temperature lower than said first elevated temperature but sufficient to effect opening of the ring of said anhydride for esterification of only one carboxyl group thereof, said reaction resulting in a finished polyester resin having a molecular weight of about 700-2,000, an hydroxyl number of about 40-60, said acid number of about 35-75 and reactive pendant carboxyl and hydroxyl groups, said pendant hydroxyl groups being present in a concentration not in excess of about 2 per molecule; and,
   (c) thereafter mixing said finished polyester resin with solvent comprising water and an aminoplast resin to form an improved liquid coatings formulation.

2. The method of claim 1 wherein said finished polyester resin has a molecular weight of about 900–1200, an acid number of about 45–60 and an average of about 1-1.5 pendant hydroxyl groups per molecule and an average of about 1 pendant carboxyl group per molecule.

3. The method of claim 1 wherein saturated aliphatic triol is present with said diol in a concentration of up to about 10 mole percent of the total moles of said diol and triol.

4. The method of claim 1 wherein said aromatic carboxylic acid and/or anhydride of step (a) is selected from the group consisting of phthalic acid, isophthalic acid, and terephthalic acid, and anhydrides and mixtures thereof, wherein said diol is selected from the group consisting of neopentyl glycol, 1-6-hexanediol and cyclohexane dimethanol and wherein said anhydride of step (b) is selected from the group consisting of phthalic anhydride, trimellitic anhydride and mixtures thereof.

5. The method of claim 1 wherein steps (a) and (b) are carried out substantially simultaneously in a single reaction zone.

6. The method of claim 1 wherein steps (a) and (b) are carried out sequentially in a single reaction zone.

7. The method of claim 1 wherein steps (a) and (b) are carried out substantially sequentially in separate reaction zones.

8. The method of claim 4 wherein said first elevated temperature is about 200°–240° C. and said second lower elevated temperature is about 140°–165° C.

9. The method of claim 8 wherein said esterifying is carried out over a period of about 3–8 hours in the presence of a catalyst.

10. The method of claim 2 wherein said solvent includes water, a water-solubilizing tertiary aliphatic amine, and a coupling solvent.

11. The method of claim 10 wherein said amine is present in said formulation in a concentration of about 4–6 percent by weight of the total solvent of said formulation.

12. The method of claim 10 wherein said coupling solvent is selected from the group consisting of 2-butoxyethanol, 2-butoxydiethylene glycol, diacetone alcohol, and mixtures thereof.

13. The method of claim 2 wherein said aminoplast resin is present in said formulation in a concentration of about 5–30 weight percent of the total of said aminoplast resin and said polyester resin.

* * * * *